United States Patent
Okuda et al.

(10) Patent No.: US 8,380,351 B2
(45) Date of Patent: Feb. 19, 2013

(54) MANIPULATOR, MANIPULATOR COLLISION DETECTING METHOD AND MANIPULATOR CONTROL METHOD

(75) Inventors: Akinobu Okuda, Osaka (JP); Osamu Mizuno, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 804 days.

(21) Appl. No.: 12/480,985

(22) Filed: Jun. 9, 2009

(65) Prior Publication Data

US 2009/0312870 A1   Dec. 17, 2009

(30) Foreign Application Priority Data

Jun. 11, 2008   (JP) .................................. 2008-152592

(51) Int. Cl.
   *G05B 15/00*   (2006.01)
(52) U.S. Cl. .......................... 700/258; 700/255; 700/275
(58) Field of Classification Search .................... 701/70, 701/302; 901/27, 28, 29, 30, 33, 34, 36; 269/240; 74/40, 42, 490.01; 700/255, 258, 700/275

See application file for complete search history.

(56) References Cited

U.S. PATENT DOCUMENTS

| | | | | |
|---|---|---|---|---|
| 5,053,687 A * | 10/1991 | Merlet | ........................ | 318/568.2 |
| 5,796,229 A * | 8/1998 | Akeel | ........................... | 318/563 |
| 6,283,859 B1 * | 9/2001 | Carlson et al. | .................. | 463/36 |
| 7,734,375 B2 * | 6/2010 | Buehler et al. | ................ | 700/245 |
| 2006/0198952 A1 * | 9/2006 | Nagase et al. | ................ | 427/154 |
| 2008/0190224 A1 * | 8/2008 | Song et al. | ........................ | 74/40 |
| 2009/0224456 A1 * | 9/2009 | Loriot et al. | .................. | 269/240 |
| 2009/0247364 A1 * | 10/2009 | Sano et al. | .................... | 477/197 |

FOREIGN PATENT DOCUMENTS

| | | |
|---|---|---|
| JP | 2-300808 | 12/1990 |
| JP | 4-29990 | 7/1992 |

* cited by examiner

*Primary Examiner* — Khoi Tran
*Assistant Examiner* — Jorge Peche
(74) *Attorney, Agent, or Firm* — Wenderoth, Lind & Ponack, L.L.P.

(57) ABSTRACT

A manipulator is provided with a first link, a second link, first and second differential input shafts rotatably supported on the first link, a differential output shaft rotatably supported on the second link, a differential gear mechanism for rotating the differential output shaft about two axes orthogonal to each other in accordance with the sum or difference of rotating speeds of the first and second differential input shafts, a first shaft rotational angle sensor for detecting rotational angle information of the first differential input shaft, a second shaft rotational angle sensor for detecting rotational angle information of the second differential input shaft, and a controller for detecting the reception of an external force by the first or second link based on an output signal of the first or second shaft rotational angle sensor.

12 Claims, 8 Drawing Sheets

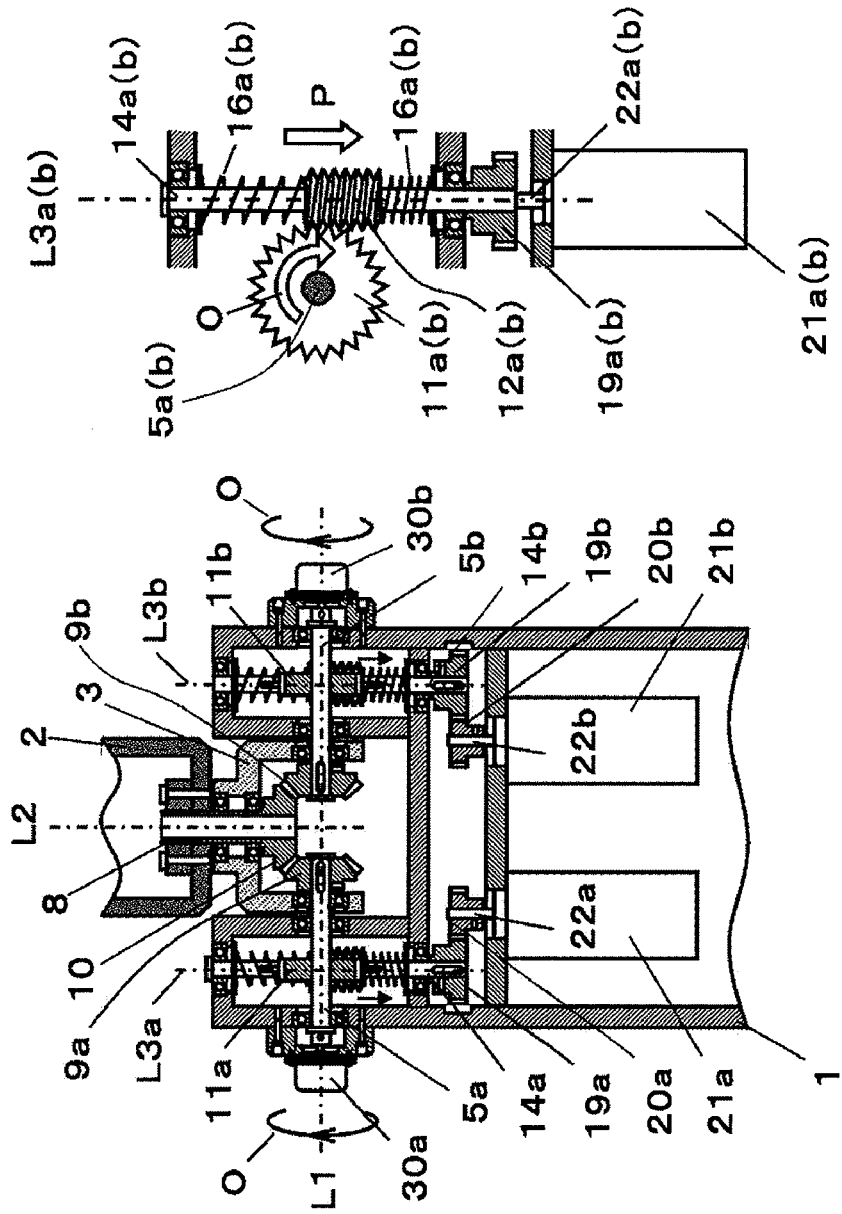

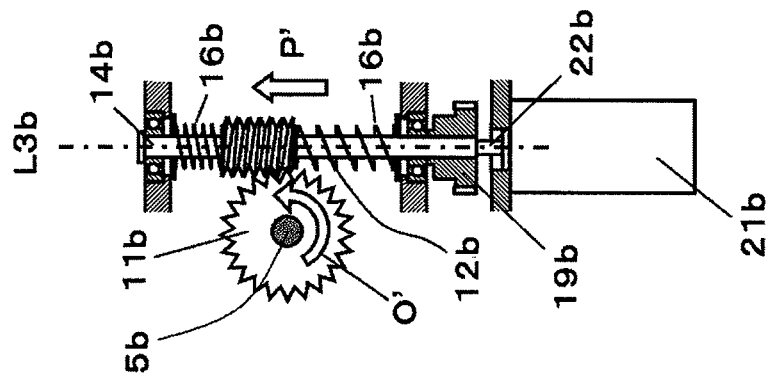
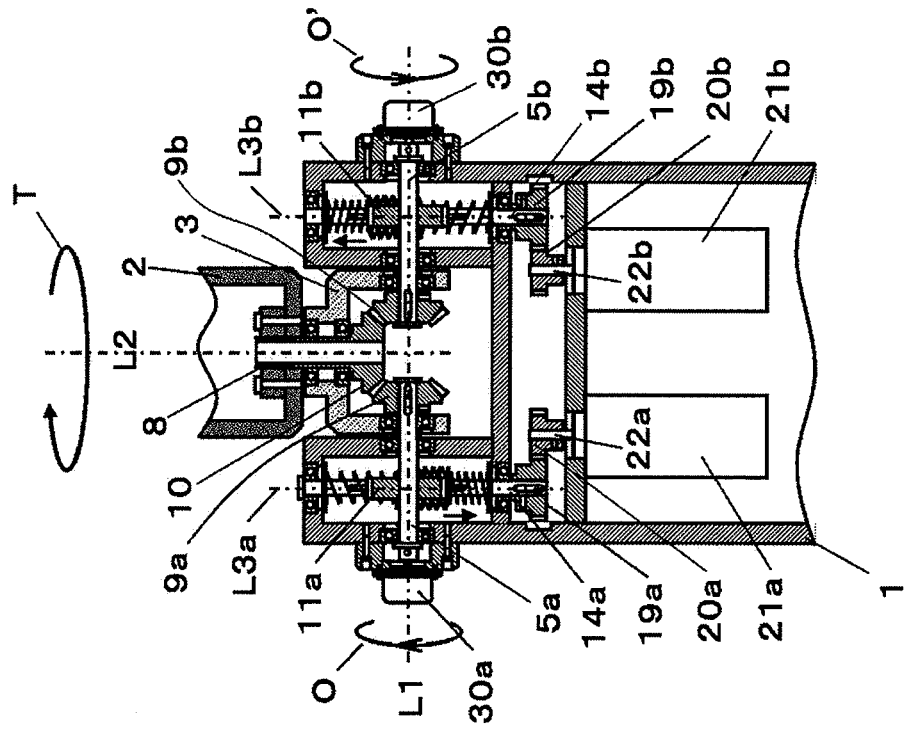
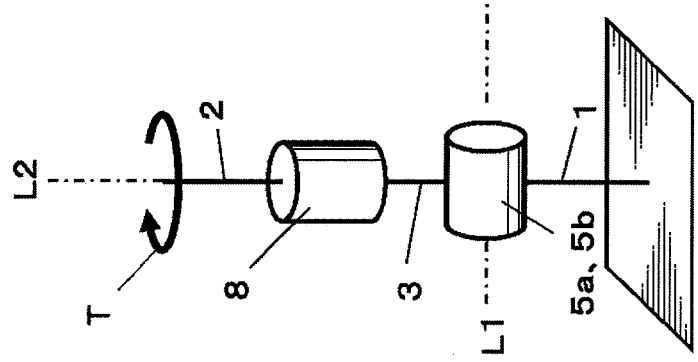

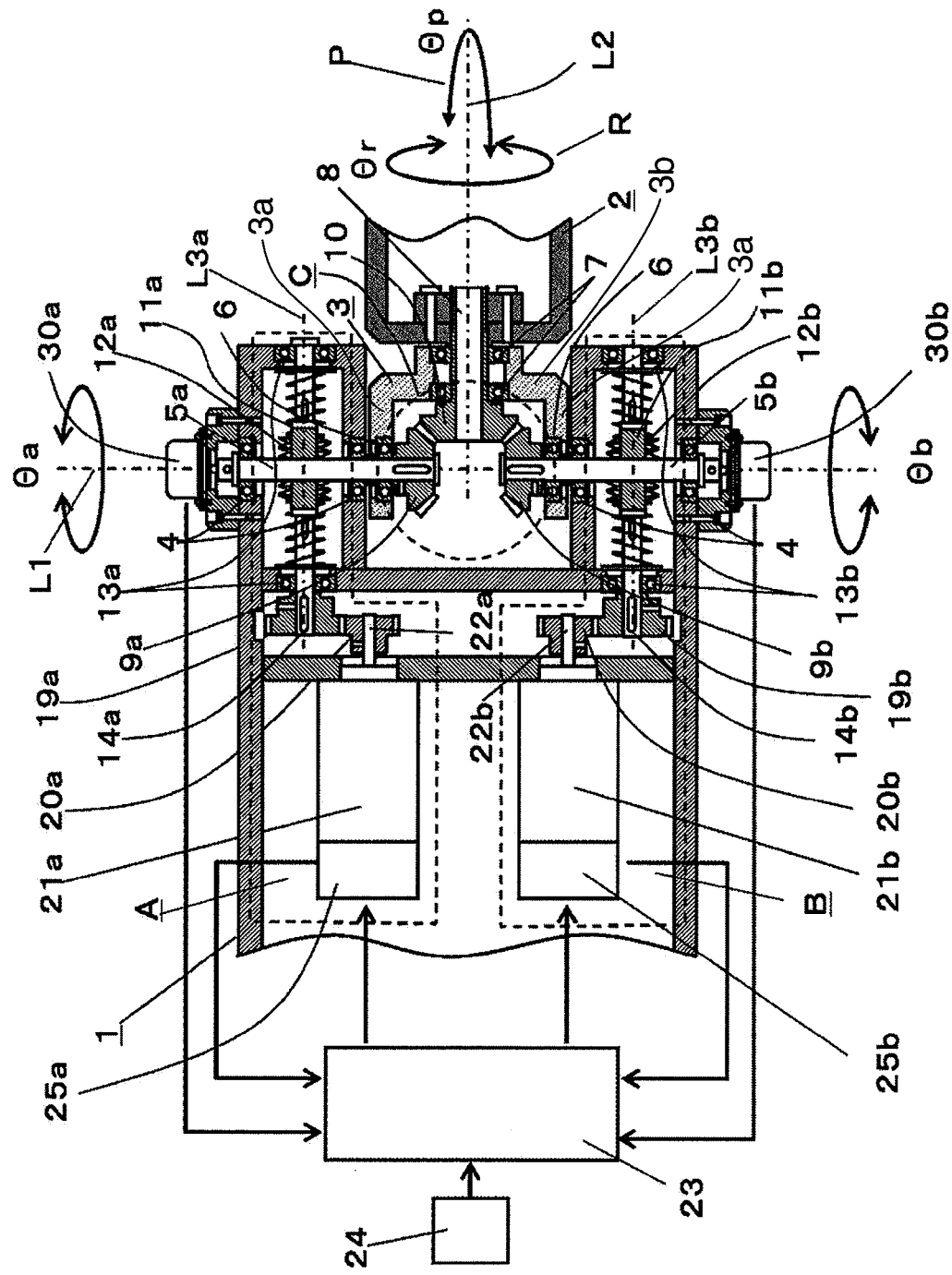

MANIPULATOR, MANIPULATOR COLLISION DETECTING METHOD AND MANIPULATOR CONTROL METHOD

BACKGROUND OF THE INVENTION

1. Field of the Invention

The present invention relates to a manipulator, a manipulator collision detecting method and a manipulator control method.

2. Description of the Related Art

In recent years, robots are making inroads into not only industrial fields, but also service fields such as medicine, welfare and household chores. Robots used in such places share operation spaces with people. Thus, there is no other choice to presume interferences of people and robots such as contacts and collisions in such environments and it is important to ensure safety against these.

Conventional manipulators represented by industrial manipulators are each constructed by combining a highly rigid member and a highly rigid actuator (such as a motor using a gear having a high speed reduction ratio) in order to ensure the accuracy of a tip position (see, for example, Japanese Examined Utility Model H04-29990B).

Thus, if an external object such as a person or a structure suddenly goes into a planned trajectory of a manipulator to come into contact with the manipulator, it is difficult to instantaneously relieve its impact force and contact force. This is because the manipulator has a non-backdrivable mechanism. Accordingly, improvement is necessary in ensuring safety for humans. Various technologies have been proposed to ensure safety against contact with an external object in such manipulators.

For example, there has been disclosed technology for detecting the collision or contact of the tip of a manipulator with an external object such as a person or a structure using a force sensor disposed at a manipulator wrist and position-controlling motors for joints of the manipulator according to an inputted force (magnitude, direction) to realize spring-like flexibility by way of a control (see, for example, Japanese Unexamined Patent Publication No. H02-300808).

However, the above manipulator has a problem of being unable to react to collision and contact with parts of the manipulator other than the tip portion.

Further, in the manipulator of Japanese Unexamined Patent Publication No. H02-300808, a pressure sensor or the like is provided on the outer surface of the manipulator so as to be able to detect a collision or contact with the parts of the manipulator other than the tip portion. However, there is a limit in response to collisions since the motors are controlled based on a sensor input. Such a sensor input has a high possibility of malfunction due to electromagnetic waves and the like and presents a problem that a reliable operation cannot be expected.

Furthermore, the special sensor as described above is necessary to detect a collision, which causes malfunctions resulting from the breakage of sensor wiring, a weight increase and a cost increase of the manipulator.

SUMMARY OF THE INVENTION

An object of the present invention is to highly responsively absorb and relieve a force resulting from a contact or collision with an external object. Another object of the present invention is to provide a low-cost, light-weight and compact manipulator without requiring a special sensor for detecting collisions.

One aspect of the present invention is directed to a manipulator, comprising a first link; a second link; first and second differential input shafts rotatably supported on the first link; a differential output shaft rotatably supported on the second link; a differential gear mechanism for rotating the differential output shaft about two axes orthogonal to each other in accordance with the sum or difference of rotating speeds of the first and second differential input shafts; a first transmitting portion for transmitting a driving force to the first differential input shaft; a second transmitting portion for transmitting a driving force to the second differential input shaft; a first shaft rotational angle sensor for detecting rotational angle information of the first differential input shaft; a second shaft rotational angle sensor for detecting rotational angle information of the second differential input shaft; and a controller for detecting the reception of an external force by the first or second link based on an output signal of the first or second shaft rotational angle sensor, wherein each of the first and second transmitting portions includes a rotatable worm elastically held at a specified position in such a manner as to be movable in a translation direction of a rotation axis and a worm wheel engaged with the worm; and the worm makes a translational movement in accordance with the external force received by the first or second link.

Another aspect of the present invention is directed to a manipulator, comprising a first link; a second link; first and second differential input shafts rotatably supported on the first link; a differential output shaft rotatably supported on the second link; a differential gear mechanism for rotating the differential output shaft about two axes orthogonal to each other in accordance with the sum or difference of rotating speeds of the first and second differential input shafts; a rotatable first worm elastically held at a specified position in such a manner as to be movable in a translation direction of a rotation axis; a first worm wheel fixed to the first differential input shaft and engaged with the first worm; a first driving source arranged in the first link for rotating the first worm; a rotatable second worm elastically held at a specified position in such a manner as to be movable in a translation direction of a rotation axis; a second worm wheel fixed to the second differential input shaft and engaged with the second worm; a second driving source arranged in the first link for rotating the second worm; a first shaft rotational angle sensor for detecting rotational angle information of the first differential input shaft; a second shaft rotational angle sensor for detecting rotational angle information of the second differential input shaft; a first driving angle sensor for detecting rotational angle information of the first driving source; a second driving rotational angle sensor for detecting rotational angle information of the second driving source; and a controller for detecting the reception of an external force by the first or second link based on an output signal of the first or second shaft rotational angle sensor and an output signal of the first or second driving rotational angle sensor, wherein the first or second worm makes a translational movement in accordance with the external force received by the first or second link.

Still another aspect of the present invention is directed to a method for detecting a collision of a manipulator comprising first and second differential input shafts rotatably supported on the first link; rotatable first and second worms elastically held at specified positions in such a manner as to be movable in translation directions of rotation axes; a first shaft rotational angle sensor for detecting rotational angle information of the first differential input shaft; and a second shaft rotational angle sensor for detecting rotational angle information of the second differential input shaft, wherein the reception of an external force by the first or second link is detected based on an output signal of the first or second shaft rotational angle sensor after the first or second worm makes a translational movement in accordance with the external force received by the first or second link.

Further another aspect of the present invention is directed to a method for controlling a manipulator comprising first and second differential input shafts rotatably supported on the first link; a differential output shaft rotatably supported on the second link; rotatable first and second worms elastically held at specified positions in such a manner as to be movable in translation directions of rotation axes; a first driving source provided in the first link for rotating the first worm; a second driving source provided in the first link for rotating the second worm; a first shaft rotational angle sensor for detecting rotational angle information of the first differential input shaft; and a second shaft rotational angle sensor for detecting rotational angle information of the second differential input shaft, wherein the driving of the first or second driving source is controlled by detecting the reception of an external force by the first or second link based on an output signal of the first or second shaft rotational angle sensor after the first or second worm makes a translational movement in accordance with the external force received by the first or second link.

BRIEF DESCRIPTION OF THE DRAWINGS

FIGS. 3A to 3C are diagrams for describing a first example of an impact absorbing operation of the manipulator, FIGS. 4A to 4C are diagrams for describing a second example of the impact absorbing operation of the manipulator, FIG. 7 is a schematic section showing an essential portion of a manipulator according to a second embodiment of the invention.

DETAILED DESCRIPTION OF THE PREFERRED EMBODIMENTS OF THE INVENTION (First Embodiment)

Figure 1:
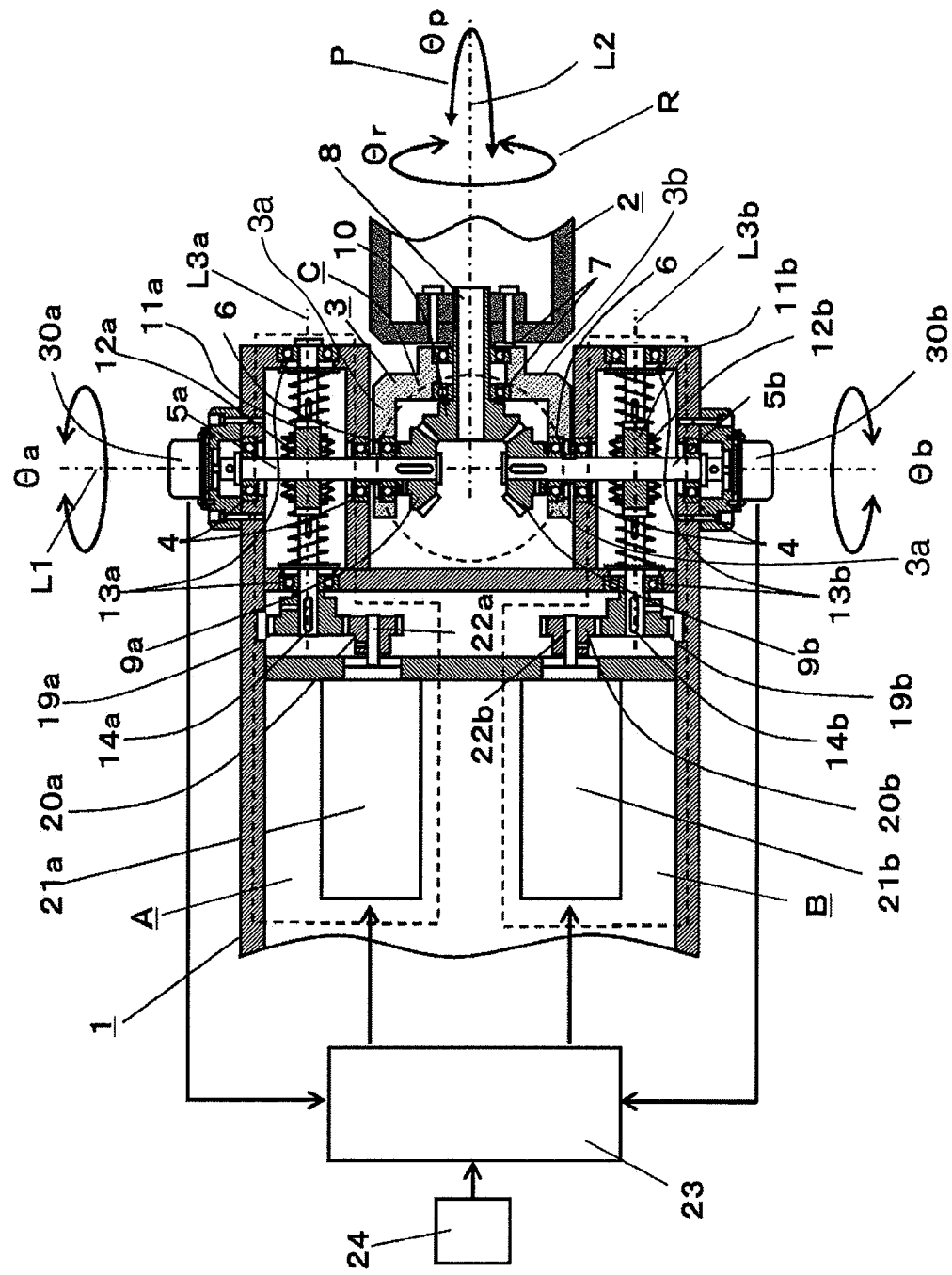
FIG. 1 is a schematic section showing an essential portion of a manipulator according to a first embodiment of the invention.
Figure 2:
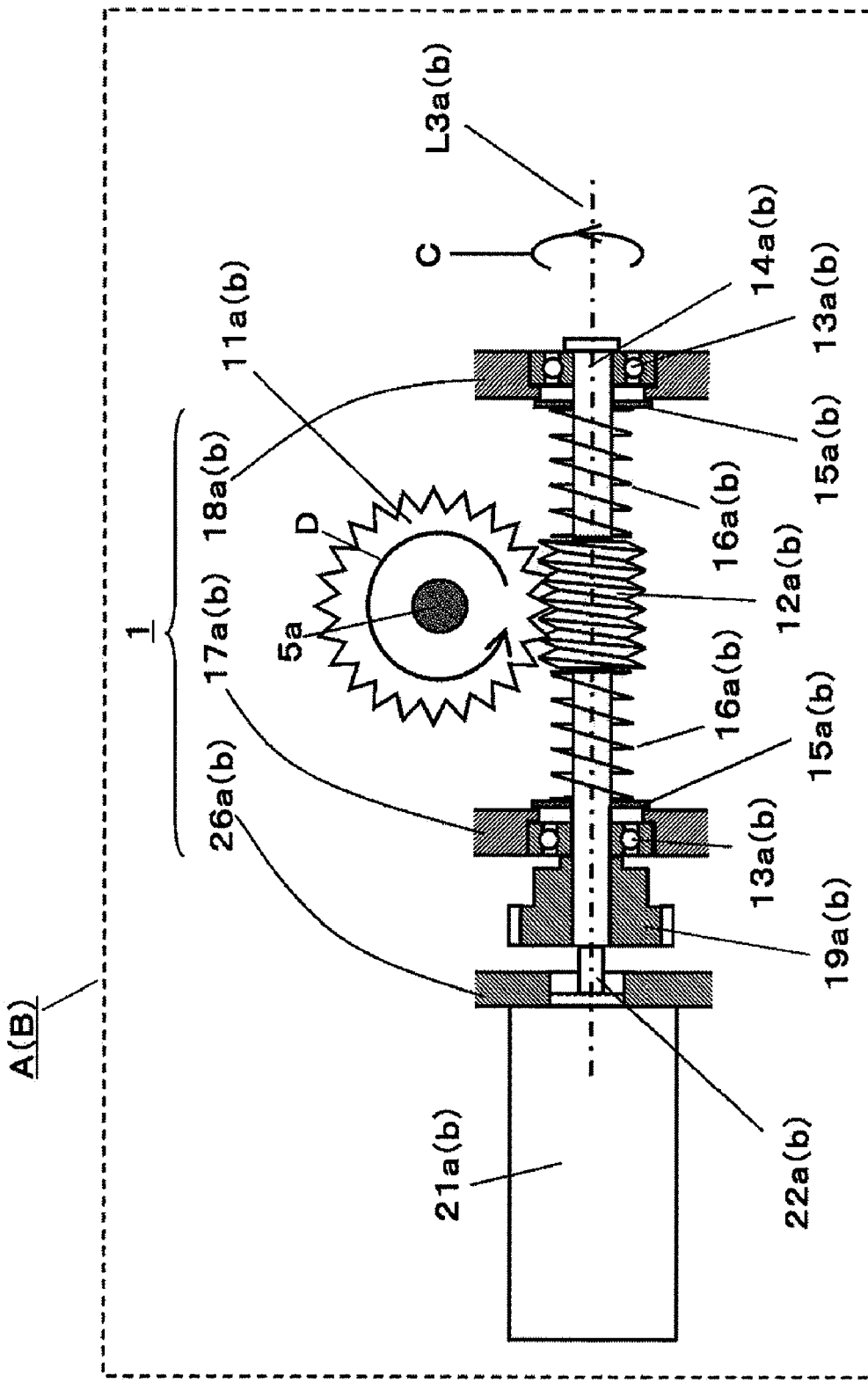
FIG. 2 is a section showing an essential portion when a driver A (B) of the manipulator is viewed sideways.

First of all, with reference to FIGS. 1 and 2, a manipulator according to a first embodiment of the present invention is described. Although a joint of the manipulator is described here, the present invention is not limited to this and applicable to joints of various machines.

FIG. 1 is a schematic section showing a joint of the manipulator according to the first embodiment of the invention, and FIG. 2 is a section showing an essential portion when a driver A shown in FIG. 1 is viewed sideways.

As shown in FIG. 1, the joint of the manipulator includes a first arm 1 as a first link and a second arm 2 as a second link. An intermediate arm 3 as an intermediate link is arranged between the first and second arms 1, 2. The first arm 1 and the intermediate arm 3 are coupled to each other via first and second differential input shafts 5a, 5b extending in a direction orthogonal to a longitudinal direction of the first arm 1. The first and second differential input shafts 5a, 5b are supported rotatably relative to the first arm 1 via bearings 4. The first and second differential input shafts 5a, 5b are arranged on the same axial line L1 and face each other in directions orthogonal to the longitudinal direction of the first arm 1. The intermediate arm 3 integrally includes a pair of vertical sections 3a extending in the longitudinal direction of the first arm 1 and a horizontal section 3b extending in a direction (width direction) perpendicular to the longitudinal direction of the first arm 1 to connect the both vertical sections 3a. The first and second differential input shafts 5a, 5b are rotatably coupled to the intermediate arm 3 via bearing 6 disposed in the vertical sections 3a of the intermediate arm 3.

The second arm 2 is arranged on an axial line L2 orthogonal to the axial line L1 of the first and second differential input shafts 5a, 5b. The second arm 2 is fixed to an end of a second shaft 8 as a differential output shaft. The second shaft 8 is rotatably supported on the intermediate arm 3 via a bearing 7 disposed in the horizontal section 3b of the intermediate arm 3.

A first input-side bevel gear 9a, a second input-side bevel gear 9b and a driven-side bevel gear 10 are fixed to one ends of the first differential input shaft 5a, the second differential input shaft 5b and the second shaft 8. These bevel gears 9a, 9b and 10 constitute a differential gear mechanism C. The input-side bevel gears 9a, 9b and the driven-side bevel gear 10 are formed to have the same shape and same size. The driven-side bevel gear 10 is arranged at such a position as to be engaged with both input-side bevel gears 9a, 9b and formed integral to the second shaft 8. The driven-side bevel gear 10 is integrally and rigidly connected with the second arm 2 using an internally threaded portion (not shown) formed in an end portion thereof.

Worm wheels 11a, 11b are respectively rigidly fixed near middle parts of the first and second differential input shafts 5a, 5b.

On the other hand, a driver A as a first transmitting portion and a driver B as a second transmitting portion are accommodated in parallel in the first arm 1. Since the drivers A, B are the same, the driver A is described here with reference to FIGS. 1 and 2.

A drive shaft 14a extending in the longitudinal direction of the first arm 1 is arranged in the first arm 1. The drive shaft 14a is supported rotatably relative to supporting walls 17a, 18a formed in the first arm 1 via bearings 13a.

The driver A includes a worm 12a and a worm wheel 11a engaged with the worm 12a. The worm 12a is arranged on an axial line L3a orthogonal to the axial line L1 and is connected with the drive shaft 14a with a rotating direction thereof restricted. For example, the drive shaft 14a is formed with a key way extending in an axial direction thereof and the worm 12a having a key (not shown) is connected with the drive shaft 14a. In this way, the worm 12a is connected with the drive shaft 14a with movements in a translation direction permitted. The worms 12a, 12b and the worm wheels 11a, 11b are both the same modules, have the same tooth number and diameter and are formed to have the same thread twisting direction (left-hand thread in FIGS. 1 and 2).

A gear 19a is fixed to one end of the drive shaft 14a. Springs 16a as biasing members are mounted between the supporting walls 17a, 18a and the worm 12a. The springs 16a are mounted on the drive shaft 14 while holding residual compressive/restoring forces. Spring washers 15a for receiving the springs 16a are inserted between the springs 16a and the supporting walls 17a, 18a. The worm 12a is elastically held at a specified drive position (centered) on the drive shaft 14a by the residual compressive/restoring forces of the springs 16a acting on the opposite end surfaces of the worm 12a. Coil springs are suitably used as the springs 16a, but the springs 16a are not limited thereto. For example, leaf springs, disc springs, helical springs and the like may also be used. Initial compression amounts of the springs 16a are preferably set such that the residual compressive/restoring forces are held also when the worm 12a makes a translational movement in a direction of the axial line L3a.

Driving sources 21a, 21b are arranged in the first arm 1. The driving sources 21a, 21b are constructed by drive motors and speed reducing mechanisms free from backlash in this embodiment. The driving source 21a is fixed to supporting walls 26a, 26b of the first arm 1. Gears 20a, 20b are fixed to ends of output shafts 22a, 22b of the driving sources 21a, 21b. These gears 20a, 20b are engaged with gears 19a, 19b fixed to ends of the drive shafts 14a, 14b. In other words, driving forces by the driving sources 21a, 21b are transmitted to the drive shafts 14a, 14b via the gears 20a, 20b and the gears 19a, 19b.

Identified by 23 in FIG. 1 is a controller for controlling the driving sources 21a, 21b and by 24 an input unit for inputting an operation instruction. An operation instruction from an external upper controller (not shown) is inputted to the input unit 24. In the case of constructing the manipulator to be remotely operable, various input devices are provided as the input unit 24. For example, a known key input device, a game pad, a joystick, a touch panel and the like can be used as the input devices.

The controller 23 includes a central processing unit (CPU) for performing various functions based on programs, a read-only memory (ROM) storing various programs, a rewritable random access memory (RAM) for temporarily saving data and an input/output device for inputting and outputting data from and to the outside. Thus, the controller 23 controls the driving of the driving sources 21a, 21b via motor drivers (not shown) while implementing various programs based on operation instruction information obtained from the input unit 24 and rotational angle information (rotational angles, rotational angular velocities, etc.) of the respective shafts obtained from a first shaft rotational angle sensor 30a connected with an end of the first differential input shaft 5a and a second shaft rotational angle sensor 30b connected with an end of the second differential input shaft 5b. The controller 23 can also detect the position and posture of the second arm 2 relative to the first arm 1 based on the rotational angle information of the differential input shafts 5a, 5b obtained from the shaft rotational angle sensors 30a, 30b. Potentiometers each including a resistance element and a slidable tap, optical encoders each including a code plate and a photosensor, magnetic encoders each including a Hall element, a magnetic resistance element and an NS bipolar magnetized rotating magnet and the like can be used as the first and second rotational angle sensors 30a, 30b. Particularly, the optical encoders and the magnetic encoders are resistant to noise and can detect rotational angles and rotational angular velocities since the outputs thereof are digital signals. In the case of the potentiometers, it is preferable to use, for example, conductive plastic potentiometers. The conductive plastic potentiometers have high angular resolution, good abrasion resistance and good high-speed following capability.

Basic operations of the joint of the manipulator constructed as described above are described below with reference to FIGS. 1 and 2.

First of all, a case where the second arm 2 is rotated relative to the first arm 1, i.e. rotated in a pitch direction (P) of FIG. 1 is described.

In this case, the output shaft 22a of the first driving source 21a and that 22b of the second driving source 21b are rotated at the same rotating speed in the same rotating direction. Then, the drive shafts 14a, 14b are respectively rotated by the same angle in the same direction via the gears 20a, 20b, 19a, 19b. At this time, if the first and second worms 12a, 12b are, for example, rotating in a direction C as shown in FIG. 2, the first and second worm wheels 11a, 11b are rotated in a direction D due to the thread twisting direction of the first and second worms 12a, 12b. Since the worm wheels 11a, 11b are rigidly connected with the first and second differential input shafts 5a, 5b, the input-side bevel gears 9a, 9b similarly rigidly connected at the leading ends of the differential input shafts 5a, 5b are rotated by the same angle in the same direction. At this time, the driven-side bevel gear 10 engaged with the input-side bevel gears 9a, 9b cannot be rotated in any direction. Thus, the second shaft 8, the driven-side bevel gear 10 and the input-side bevel gears 9a, 9b integrally revolve about the axial line L1. In other words, the second arm 2 is rotated in the pitch direction (P), i.e. toward the front side of the plane of FIG. 1, about the axial line L1 relative to the first arm 1. In this case, if the rotating speeds of the output shafts 22a, 22b of the first and second driving sources 21a, 21b differ from each other, the driven-side bevel gear 10 not only revolves about the axial line L1 of the first arm 1, but also rotates about the axial line L2 of the second arm 2. Therefore, the second arm 2 is rotated in a roll direction (R) in addition to pivoting in the pitch direction (P) as shown in FIG. 1.

Next, a case where the second arm 2 is rotated relative to the first arm 1, i.e. rotated in the roll direction (R) of FIG. 1 is described.

In this case, the output shaft 22a of the first driving source 21a and that 22b of the second driving source 21b are rotated at the same rotating speed in opposite directions. Then, the drive shafts 14a, 14b are respectively rotated by the same angle in the opposite directions via the gears 20a, 20b, 19a, 19b. At this time, if the first worm 12a is rotating in the direction C and the second worm 12b is rotating in a direction opposite to the direction C, for example, as shown in FIG. 2, the first worm wheel 11a is rotated in a direction D and the second worm wheel 11b is rotated in a direction opposite to the direction D due to the thread twisting direction of the first and second worms 12a, 12b. Since the worm wheels 11a, 11b are rigidly connected with the first and second differential input shafts 5a, 5b, the input-side bevel gears 9a, 9b similarly rigidly connected at the leading ends of the differential input shafts 5a, 5b are rotated by the same angle in opposite directions. At this time, the driven-side bevel gear 10 engaged with the input-side bevel gears 9a, 9b revolves about the axial line L2. In other words, the second arm 2 is rotated in the roll direction (R) relative to the first direction 1. In this case as well, if the rotating speeds of the output shafts 22a, 22b of the first and second driving sources 21a, 21b differ from each other, the driven-side bevel gear 10 not only rotates about the axial line L2, but also revolves about the axial line L1. Therefore, the second arm 2 pivots while being rotated relative to the first arm 1.

At this time, if θa, θb denote rotational angles of the first and second differential input shafts 5a, 5b obtained by the first and second shaft rotational angle sensors 30a, 30b connected with the first and second differential input shafts 5a, 5b, a pivot angle θp and a rotational angle θr of the second arm 2 relative to the first arm 1 are given by the following equations (1) and (2). The rotational angle θr is a rotational angle about the axis.

$$\theta p = 1/2(\theta a + \theta b) \quad (1)$$

$$\theta r = 1/2(\theta a - \theta b) \quad (2)$$

Here, if the rotating direction of the first differential input shaft 5a (first input-side bevel gear 9a) and that of the second differential input shaft 5b (second input-side bevel gear 9b) are same and the rotational angles of the both are equal, the rotational angles θa, θb satisfy θa=θb. Thus, the second arm 2 is moved relative to the first arm 1 at the pivot angle θp=θa=θb and at the rotational angle θr=0 from equations (1) and (2). On the other hand, if the first and second differential input shafts 5a, 5b are rotated by the same angle in opposite directions, the rotational angles θa, θb satisfy θa=−θb. Thus, the second arm 2 is moved relative to the first arm 1 at the pivot angle θp=0 and at the rotational angle θr=θa=−θb from equations (1) and (2). In either case, if there is a relative angle difference between the rotational angles θa, θb, the second arm 2 is rotated while pivoting relative to the first arm 1 based on angles obtained from equations (1) and (2).

Although equations (1) and (2) express a relationship of the rotational angles θa, θb of the first differential input shaft 5a (first input-side bevel gear 9a) and the second differential input shaft 5b (second input-side bevel gear 9b), the pivot angle θp of the second arm 2 relative to the first arm 1 and the rotational angle θr of the second arm 2 relative to the first arm 1, similar relational expressions hold for the rotational angular velocities and rotational angular accelerations.

Next, a collision force absorbing/relieving operation in the joint of the manipulator as a constructional feature of this embodiment is described with reference to FIGS. 3 and 4.

First of all, the collision force absorbing/relieving operation in the case where a collision force (external force) F is exerted to a leading end 2a of the second arm 2 in a direction perpendicular to the axial lines L1 (hereinafter, "pivot axis") and L2 (hereinafter, "rotation axis") is described as a first example with reference to FIG. 3.

FIG. 3A is a diagram functionally showing the joint of the manipulator in this embodiment. As shown in FIG. 3A, if the collision force (external force) F is exerted to the leading end 2a of the second arm 2 in the direction perpendicular to the pivot axis L1 and the rotation axis L2, a rotational torque O is generated about the pivot axis L1 by this collision force F. This rotational torque O is transmitted as a rotational force to the first and second worm wheels 11a, 11b fixed to the first and second differential input shafts 5a, 5b via the driven-side bevel gear 10, the input-side bevel gears 9a, 9b, the first differential input shaft 5a, the second differential input shaft 5b and the like as shown in FIG. 3B. This rotational force causes the worm 12a(b) to produce a translational force P via engaged parts of the worm wheel 11a(b) and the worm 12a(b) as shown in FIG. 3C. At this time, if this translational force P is greater than necessary, the worm 12a(b) slides in the direction of the axial line L3a(b) and this force is absorbed and relieved by the elastic action of the springs 16a(b) arranged at the opposite ends of the worm 12a(b). In other words, the worm 12a(b) is translationally displaced in the longitudinal direction of the drive shaft 14a(b) by the rotational force of the worm wheel 11a(b), whereby the force transmitted to the worm wheel 11a(b) is permitted to escape.

After the collision force F is permitted to take off, the worm 12a(b) automatically returns to the initial engaged position by the centering of the worm 12a(b) resulting from the compressive/restoring forces of the springs 16a(b). In this way, the second arm 2 automatically returns to the posture before the collision relative to the first arm 1.

Next, the collision force absorbing/relieving operation in the case where a collision torque T acting about the rotation axis L2 is exerted to the second arm 2 is described as a second example with reference to FIGS. 4A to 4C.

Similar to FIG. 3A, FIG. 4A is a diagram functionally showing the joint of the manipulator in this embodiment. If the collision torque (acting about the axial line L2) is exerted to the second arm 2 as shown in FIG. 4A, this collision torque T is transmitted as rotational forces O, O' to the worm wheels 11a, 11b fixed to the first and second differential input shafts 5a, 5b via the driven-side bevel gear 10, the input-side bevel gears 9a, 9b, the first differential input shaft 5a, the second differential input shaft 5b and the like as shown in FIG. 4B. Out of these forces, the rotational force O' causes the worm 12b to produce a translational force P' via engaged parts of the second worm wheel 11b and the second worm 12b as shown in FIG. 4C. At this time, if this translational force P' is greater than necessary, the worm 12b slides in the direction of the axial line L3b and this force is absorbed and relieved by the elastic action of the springs 16b arranged at the opposite ends of the worm 12b. Since the operation of the worm 11a to absorb and relieve the rotational force O is similar to the first example (FIG. 3C) described above, it is not described.

After the collision torque T is permitted to take off, the first and second worms 12a, 12b automatically return to the initial engaged positions by the centering of the first and second worms 12a, 12b resulting from the compressive/restoring forces of the first and second springs 16a, 16b similar to the first example. In this way, the second arm 2 automatically returns to the posture before the collision relative to the first arm 1.

Although the collision force absorbing/relieving operation is described by way of the first and second examples here, the present invention is not limited to this. For example, even if a collision force and a collision torque are simultaneously exerted, they can be absorbed and relieved by similar operations.

In the case of detecting a collision between the second arm 2 and an external person or object using a collision detecting method to be described later and stopping the driving sources 21a, 21b (in the case of shutting off power application to the motors), rotational forces momentarily act on the worms 12a, 12b coupled to the motors via the gears and the like. This is because the motors have inertial energy. However, since the worms 12a, 12b slide along the axial lines L3a, L3b while rotating at this time, the inertial energy of the motors is absorbed and relieved by the elastic action of the springs 16a, 16b arranged at the opposite ends of the worms 12a, 12b. As a result, the action of a force on a collision partner due to the inertia of the motors can be prevented.

Figure 5:
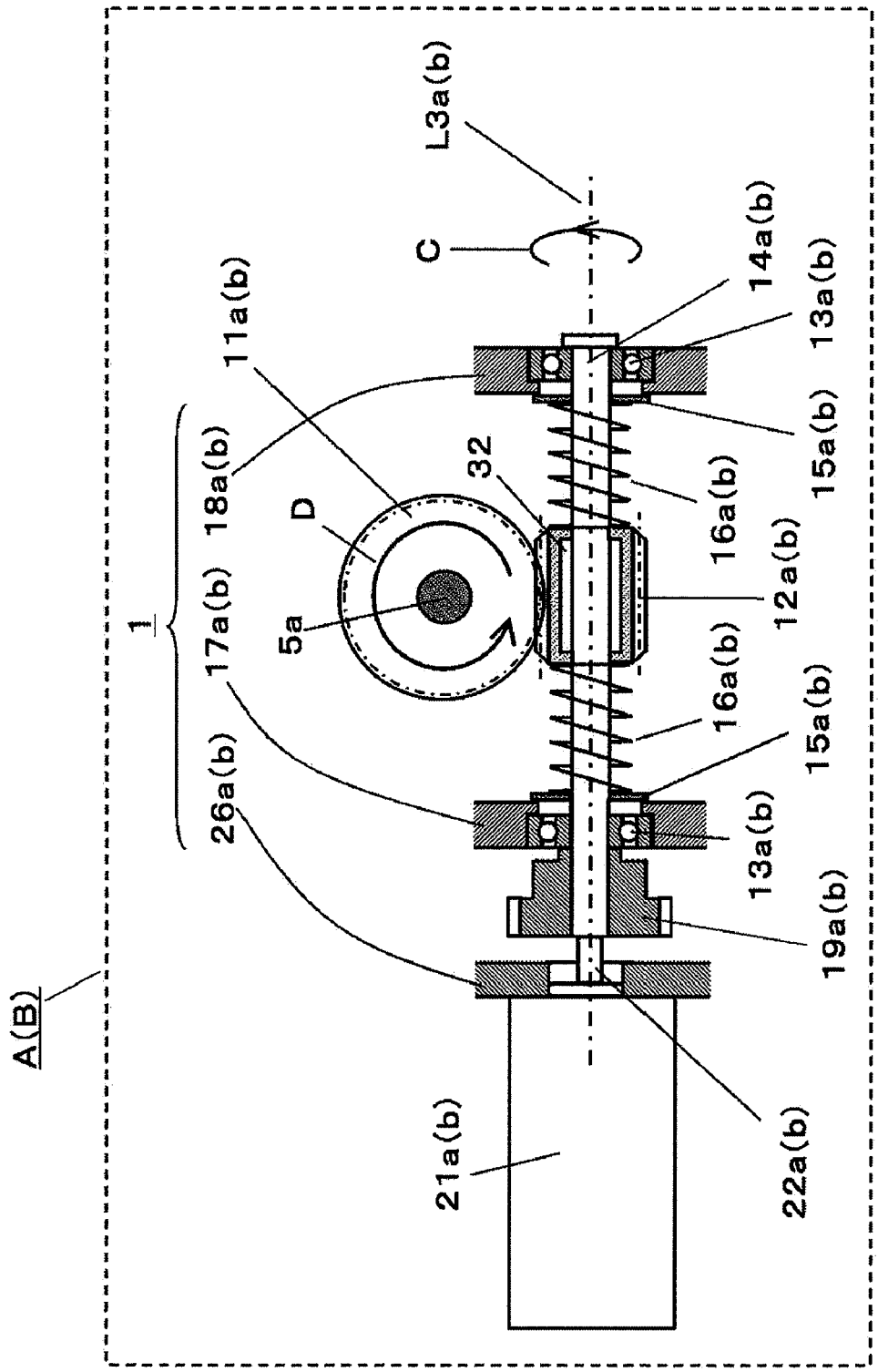
FIG. 5 is a section showing an essential portion when another construction example of the driver A (B) of the manipulator is viewed sideways.

As shown in FIG. 5, a viscous material 32 as a speed reduction member may be filled between the worm 12a(b) and the drive shaft 14a(b). A gel-like material or an oil-like material with high viscosity can be preferably used as the viscous material 32. The viscous material 32 is a material for producing a resistance force corresponding to a relative speed between the drive shaft 14a(b) and the worm 12a(b). By adopting such a construction, upon the contact or collision of the manipulator with an external person or object, a resulting collision force can be absorbed and relieved also using an energy dissipation action by the viscosity of the viscous material 32 in addition to the elastic action by the springs 16a(b). Further, since elastic energy accumulated in the springs 16a(b) is not instantaneously released when the collision force F, the collision torque T or the like is permitted to escape, there is an advantage of higher safety.

Figure 6B:
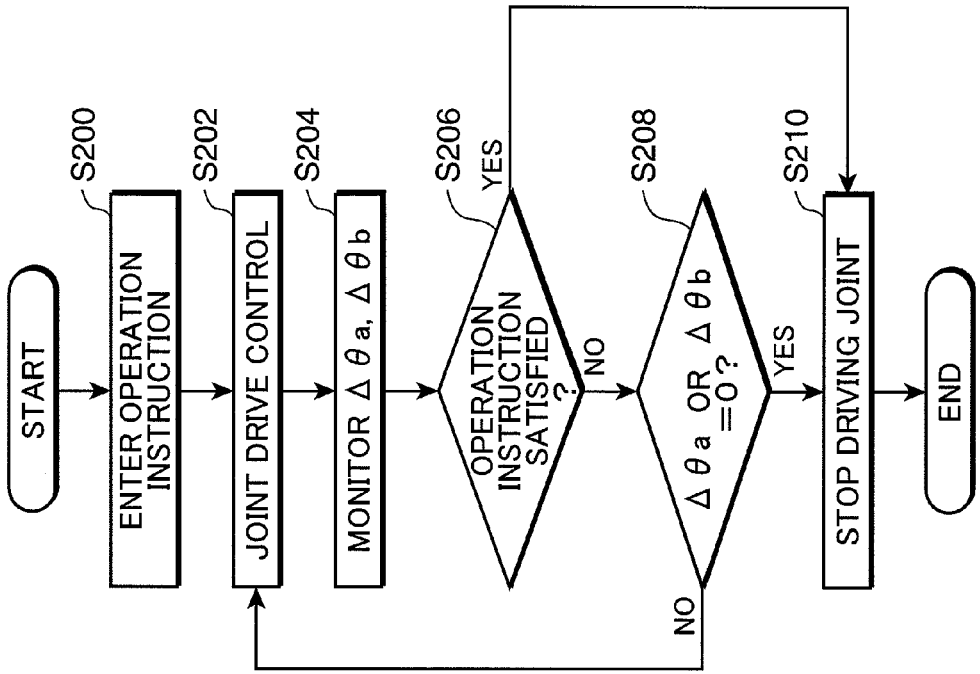
FIGS. 6A and 6B are flow charts showing a collision detecting operation of the manipulator.
Figure 6A:
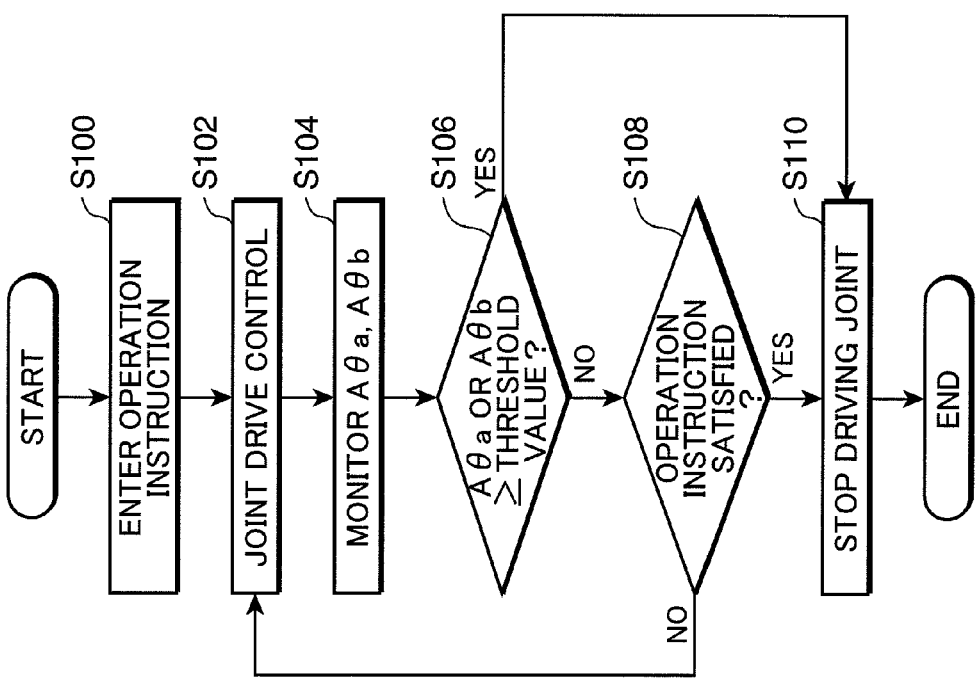

Next, a collision detecting operation of the joint of the manipulator is described with reference to FIGS. 6A and 6B. FIGS. 6A and 6B are flow charts showing the collision detecting operation using the first and second shaft rotational angle sensors 30a, 30b provided to control an angle of the joint of the manipulator according to the first embodiment of the present invention.

FIG. 6A is the flow chart showing a first example of the collision detecting operation. As shown in FIG. 6A, an operation instruction such as a target value is first entered in the input unit 24 of the manipulator (Step S100).

Subsequently, the controller 23 controls the driving of the driving sources 21a, 21b for the joint of the manipulator based on the operation instruction information obtained from the input unit 24 and rotational angle information (rotational angles, rotational angular velocities, etc.) of the respective differential input shafts 5a, 5b obtained from the first and second shaft rotational angle sensors 30a, 30b connected with the ends of the first and second differential input shafts 5a, 5b (Step S102).

Subsequently, the controller 23 computes and monitors rotational angular accelerations A$\theta$a, A$\theta$b of the respective first and second differential input shafts 5a, 5b from output values of the shaft rotational angle sensors 30a, 30b provided on the differential input shafts 5a, 5b of the joint of the manipulator (Step S104).

Subsequently, the controller 23 judges whether the above rotational angular acceleration A$\theta$a or A$\theta$b is equal to or larger than a threshold value (Step S106). The controller 23 judges "a collision" with an external person or object and immediately stops the driving of the driving sources 21a, 21b for the joint of the manipulator (Step S110) if the rotational angular acceleration A$\theta$a or A$\theta$b exceeds the threshold value. On the other hand, if neither of the rotational angular accelerations A$\theta$a, A$\theta$b exceeds the threshold value, the controller 23 judges "no collision" with an external person or object.

This threshold value is preferably set to a value equal to or larger than the maximum rotational angular acceleration of the differential input shafts 5a, 5b calculated from the maximum output of the driving sources 21a, 21b and a speed reduction ratio of a power transmission system from the respective motors of the driving sources 21a, 21b to the differential input shafts 5a, 5b. The rotational angular accelerations produced in the first and second differential input shafts 5a, 5b when the manipulator comes into contact or collision with a person or an object during its operation are considerably larger than those produced when the manipulator is normally driven. Thus, a collision can be reliably detected by setting the threshold value as described above.

Upon judging "no collision", the controller 23 judges whether or not the operation instruction was satisfied based on the output values of the first and second shaft rotational angle sensors 30a, 30b. If the operation instruction was satisfied, the driving of the driving sources 21a, 21b for the joint of the manipulator is stopped to stop the operation (Step S110). On the other hand, if the operation instruction was not satisfied, this routine returns to Step S102 to continue a joint drive control.

FIG. 6B is the flow chart showing a second example of the collision detecting operation. In this second example, an operation instruction such as a target value is first entered in the input unit 24 of the manipulator as shown in FIG. 6B (Step S200).

Subsequently, the controller 23 controls the driving of the driving sources 21a, 21b for the joint of the manipulator based on the operation instruction information obtained from the input unit 24 and rotational angle information (rotational angles, rotational angular velocities, etc.) of the respective differential input shafts 5a, 5b obtained from the first and second shaft rotational angle sensors 30a, 30b provided on the differential input shafts 5a, 5b of the joint of the manipulator (Step S202).

Subsequently, the controller 23 computes and monitors rotational angular displacements $\Delta\theta$a, $\Delta\theta$b of the respective first and second differential input shafts 5a, 5b from output values of the shaft rotational angle sensors 30a, 30b provided on the differential input shafts 5a, 5b of the joint of the manipulator (Step S204).

Subsequently, the controller 23 judges whether or not the operation instruction was satisfied from the output values of the shaft rotational angle sensors 30a, 30b (Step S206). At this time, the controller 23 stops the driving of the driving sources 21a, 21b for the joint of the manipulator to stop the operation (Step S210) if the operation instruction is judged to have been satisfied.

On the other hand, if the operation instruction is judged not to have been satisfied, the controller 23 judges whether or not at least one of the rotational angular displacements $\Delta\theta$a, $\Delta\theta$b is zero for a specified period (Step S208). If at least one of the rotational angular displacements $\Delta\theta$a, $\Delta\theta$b is zero for the specified period, the controller 23 judges "a collision" with an external person or object and immediately stops the driving of the driving sources 21a, 21b for the joint of the manipulator (Step S210). On the other hand, if neither of the rotational angular displacements $\Delta\theta$a, $\Delta\theta$b is zero for the specified period, "no collision" with an external person or object is judged and this routine returns to Step S202 to continue the joint drive control.

If the manipulator comes into contact or collision with a person or object during its operation, the rotation of the first and second differential input shafts 5a, 5b is restricted by this contact object and at least one of the rotational angular displacements $\Delta\theta$a, $\Delta\theta$b becomes zero. Thus, by monitoring the rotational angular displacements, a collision can be detected. Although the joint angular displacements $\Delta\theta$a, $\Delta\theta$b are monitored here, joint angular velocities V$\theta$a, V$\theta$b may be monitored instead by a similar principle.

As described above, according to this embodiment, the elastically supported worms make translational movements in the directions of their rotation axes if the manipulator comes into contact or collision with an external object such as a person or a structural part, whereby an impact force can be quickly and elastically absorbed and relieved.

According to this embodiment, since the shaft rotational angle sensors provided to control the joint angle of the manipulator can be used as collision detecting sensors, the presence or absence of a contact or collision can be judged based on the output values of the sensors. This obviates the need for a special sensor for detecting a collision, wherefore lower cost and lighter weight of the manipulator can be realized and quick collision detection can be performed. Furthermore, since the manipulator of this embodiment has the differential gear mechanism to which driving forces from the two driving sources are respectively inputted, the miniaturization of the manipulator can be realized while shaft torques are ensured.

Although the worms 12a, 12b are mounted on the drive shafts 14a, 14b while being permitted to move in the longitudinal direction in this embodiment, the present invention is not limited to this. For example, the worms 12a, 12b may be so rigidly connected as not to displace relative to the drive shafts, whereas the drive shafts 14a, 14b themselves may be movable in the directions of the axial lines L3a, L3b thereof. In this case, the tooth widths of the gears 19a, 19b in the longitudinal direction may be determined according to movement strokes of the drive shafts 14a, 14b. By doing so, even if the drive shafts 14a, 14b are displaced, the gears 19a, 19b and the gears 20a, 20b can be kept engaged.

Although the contact or collision of the manipulator itself with an external person or object is described in this embodiment, the present invention is not limited thereto. For example, an impact force (external force) which acts on an article by the contact with a floor or the like in an operation of placing the article using the manipulator can also be absorbed and relieved by the joint of the manipulator. In this way, damage of the article caused during the placing operation can also be prevented.

The manipulator of this embodiment can be used, for example, as joints of various manipulators such as multi-joint arms and hands. Thus, there is an advantage of being able to provide safer manipulators and robots including such manipulators. Robots are not particularly limited. For example, various robots such as intelligent robots, medical/rehabilitation robots and household robots can be cited in addition to industrial robots.

(Second Embodiment)

Figure 8:
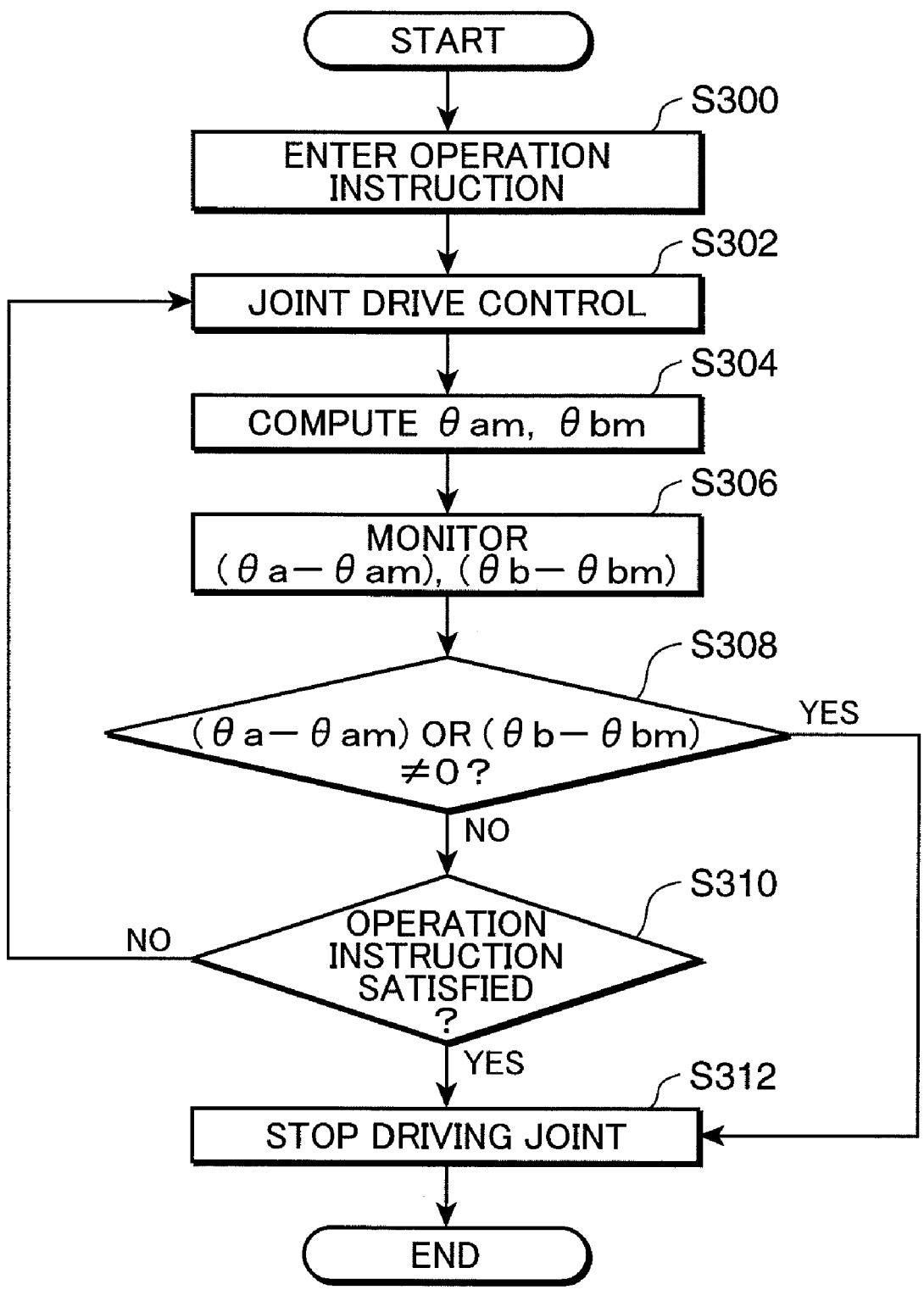
FIG. 8 is a flow chart showing a collision detecting operation of the manipulator.

Next, a manipulator according to a second embodiment of the present invention is described with reference to FIGS. 7 and 8. FIG. 7 is a schematic section of a joint of the manipulator according to the second embodiment of the present invention and FIG. 8 is a flow chart showing a collision detecting operation of the joint of this manipulator.

The joint of the manipulator shown in FIG. 7 is similar to that of the first embodiment except that driving rotational angle sensors 25a, 25b for measuring rotational angle information (rotational angles, rotational angular velocities, etc.) of the motors are provided at sides opposite to the motor output shafts 22a, 22b of the driving sources 21a, 21b of the first embodiment.

The other constructions are similar to the first embodiment.

In this embodiment, a controller 23 controls the driving of driving sources 21a, 21b via motor drivers (not shown) while implementing various programs based on rotational angle information (rotational angles, rotational angular velocities, etc.) of the respective motors obtained from the driving rotational angle sensors 25a, 25b in addition to operation instruction information obtained from an input unit 24 and rotational angle information (rotational angles, rotational angular velocities, etc.) of differential input shafts 5a, 5b obtained from shaft rotational angle sensors 30a, 30b connected with the differential input shafts 5a, 5b of the joint of the manipulator. By also using the rotational angle information of the respective motors obtained from the driving rotational angle sensors 25a, 25b for the drive control of the driving sources 21a, 21b in this way, a drive control for the joint of the manipulator can be more accurately performed.

Potentiometers each including a resistance element and a slidable tap, optical encoders each including a code plate and a photosensor, magnetic encoders each including a Hall element, a magnetic resistance element and an NS bipolar magnetized rotating magnet and the like can be used as the driving rotational angle sensors 25a, 25b. Particularly, the optical encoders and the magnetic encoders are resistant to noise and can detect rotational angles and rotational angular velocities since the outputs thereof are digital signals. In the case of the potentiometers, it is preferable to use, for example, conductive plastic potentiometers. The conductive plastic potentiometers have high angular resolution, good abrasion resistance and good high-speed following capability.

Since an operation of the joint of the manipulator to absorb and relieve a collision force upon the contact or collision of the manipulator with an external person or object is similar to that of the first embodiment, it is not described. In this embodiment, only a collision detecting operation of the joint of this manipulator as a point of difference is described with reference to FIG. 8. In the following description, constituent elements similar to those of the first embodiment are identified by the same reference numerals.

The collision detecting operation of the joint of the manipulator is described below with reference to FIG. 8. FIG. 8 is a flow chart showing the collision detecting operation using the shaft rotational angle sensors 30a, 30b and the driving rotational angle sensors 25a, 25b provided to control the angle of the joint of the manipulator in the second embodiment of the present invention.

As shown in FIG. 8, an operation instruction such as a target value is first entered in the input unit 24 of the manipulator (Step S300).

Subsequently, the controller 23 controls the driving of the driving sources 21a, 21b based on the operation instruction information obtained from the input unit 24, rotational angle information (rotational angles, rotational angular velocities, etc.) of the respective differential input shafts 5a, 5b obtained from the shaft rotational angle sensors 30a, 30b connected with ends of the differential input shafts 5a, 5b of the joint of the manipulator, and rotational angle information (rotational angles, rotational angular velocities, etc.) of the respective motors obtained from the driving rotational angle sensors 25a, 25b (Step S302).

Subsequently, the controller 23 computes driving rotational angles θam, θbm of the differential input shafts 5a, 5b as comparative rotational angles based on the rotational angle information of the respective motors obtained from the driving rotational angle sensors 25a, 25b and a speed reduction ratio of a power transmission system from the respective motors to the differential input shafts 5a, 5b (Step S304).

Subsequently, the controller 23 monitors differences between the driving rotational angles θam, θbm computed above and actual rotational angles obtained by the shaft rotational angle sensors 30a, 30b (Step S306).

Subsequently, the controller 23 judges whether or not at least one of the differences (θa−θam), (θb−θbm) is zero (Step S308). At this time, unless at least one of the differences (θa−θam), (θb−θbm) is zero, the controller 23 judges "a collision" of the manipulator with an external person or object and immediately stops the driving of the driving sources 21a, 21b for the joint of the manipulator (Step S312).

On the other hand, if both of the differences (θa−θam), (θb−θbm) are zero, the controller 23 judges "no collision" with an external person or object and further judges whether or not the operation instruction was satisfied (Step S310).

If the operation instruction is judged to have been satisfied, the driving of the driving sources 21a, 21b for the joint of the manipulator is stopped to stop the operation (Step S312). On the other hand, if the operation instruction is judged not to have been satisfied, this routine returns to Step S302 to continue a joint drive control.

If the manipulator comes into contact or collision with an external person or object during its operation, the rotation of the differential input shafts 5a, 5b is restricted by the external person or object. In other words, at least one of the actual rotational angles θa, θb of the differential input shafts 5a, 5b outputted from the shaft rotational angle sensors 30a, 30b is restricted to an angle at the time of the collision. At this time, the worm wheel 11a, 11b fixed to the differential input shaft 5a, 5b restricted to the angle at the time of the collision also has the rotation thereof restricted. Since the worm 12a, 12b engaged with this worm wheel 11a, 11b is slidable along the axial line L3a, L3b, it continues to rotate while making a translational movement. At this time, the motor of the driving source 21a, 21b for driving the worm 12a, 12b also continues to rotate. As a result, at least one of the driving angles θam, θbm has a value different from the corresponding actual rotational angle θa, θb and at least one of the differences (θa−θam), (θb−θbm) has a value other than zero. Thus, by monitoring these differences (θa−θam), (θb−θbm), the collision can be detected.

As described above, according to this embodiment, the shaft rotational angle sensors and the driving rotational angle sensors provided to control the angle of the joint of the manipulator can double as collision detecting sensors and the presence or absence of a collision can be judged using the output values thereof similar to the first embodiment. This obviates the need for a special sensor for detecting a collision, wherefore quick collision detection can be performed while lower cost and lighter weight of the manipulator are realized.

The manipulator of this embodiment can be used, for example, as joints of various manipulators such as multi-joint arms and hands similar to the first embodiment. Thus, there is an advantage of being able to provide safer manipulators and robots including such manipulators. Robots are not particularly limited. For example, various robots such as intelligent robots, medical/rehabilitation robots and household robots can be cited in addition to industrial robots.

SUMMARY OF THE EMBODIMENTS

The above embodiments are summarized as follows.

(1) In the above embodiments, the elastically supported worms make translational movements in the rotation axis directions, thereby being able to quickly and elastically absorb and relieve a collision force if the manipulator comes into contact or collision with an external object such as a person or a structure. Further, by using the shaft rotational angle sensors provided to control the joint angle of the arms also as the collision detecting sensors, it is possible to realize a cost reduction and weight saving of the arms and perform quick collision detection. Further, since the differential gear mechanism is provided in the above embodiments, the miniaturization of the manipulator can be realized while shaft torques are ensured.

(2) The manipulator further includes the intermediate link for rotatably supporting the first and second differential input shafts and the differential output shaft, the first and second differential input shafts are arranged on the same straight line, the differential gear mechanism includes the first input-side bevel gear fixed to the first differential input shaft and driven by the worm wheel, the second input-side bevel gear fixed to the second differential input shaft and driven by the worm wheel and the driven-side bevel gear engaged with the first and second input-side bevel gears.

According to such a construction, the elastically supported worms make translational movements in the rotation axis directions, thereby being able to quickly and elastically absorb and relieve a collision force if the manipulator comes into contact or collision with an external object such as a person or a structure. Further, by using the shaft rotational angle sensors provided to control the joint angle of the manipulator also as the collision detecting sensors, it is possible to realize a cost reduction and weight saving of the arms and perform quick collision detection.

(3) The first driving source arranged in the first link for driving the worm of the first transmitting portion and the second driving source arranged in the first link for driving the worm of the second transmitting portion are further provided, and the controller controls the driving of the first and second driving sources in accordance with output signals of the first and second shaft rotational angle sensors.

(4) The controller detects the reception of an external force by the first or second link based on whether or not at least one of the rotational angular acceleration $A\theta a$ of the first differential input shaft obtained from the output signal of the first shaft rotational angle sensor and the rotational angular acceleration $A\theta b$ of the second differential input shaft obtained from the output signal of the second shaft rotational angle sensor is equal to or larger than a maximum rotational angular acceleration which can be generated in the first or second differential input shaft during a normal operation.

In such a construction, if the manipulator receives an external force, the rotational angular accelerations generated in the first and second differential input shafts are considerably larger than those generated in the differential input shafts when the manipulator is normally driven. Thus, a collision can be reliably and quickly detected based on whether or not at least one of the rotational angular accelerations $A\theta a$, $A\theta b$ of the first and second differential input shafts is equal to or larger than the maximum rotational angular acceleration which can be generated in the differential input shaft during the normal operation.

(5) The controller detects the reception of an external force by the first or second link based on whether or not at least one of the rotational angular displacement $\Delta\theta a$ of the first differential input shaft obtained from the output signal of the first shaft rotational angle sensor and the rotational angular displacement $\Delta\theta b$ of the second differential input shaft obtained from the output signal of the second shaft rotational angle sensor is zero.

In such a construction, when the manipulator receives an external force, the rotation of the differential input shafts is restricted by an external person or object. Thus, at least one of the rotational angular displacements $\Delta\theta a$, $\Delta\theta b$ becomes zero. Therefore, a collision can be reliably detected based on whether or not at least one of rotational angular displacements $\Delta\theta a$, $\Delta\theta b$ is zero.

(6) The controller detects the reception of an external force by the first or second link based on whether or not at least one of the rotational angular velocity $V\theta a$ of the first differential input shaft obtained from the output signal of the first shaft rotational angle sensor and the rotational angular velocity $V\theta b$ of the second differential input shaft obtained from the output signal of the second shaft rotational angle sensor is zero.

In such a construction, when the manipulator receives an external force, the rotation of the differential input shafts is restricted by an external person or object. Thus, at least one of the rotational angular velocities $V\theta a$, $V\theta b$ becomes zero. Therefore, a collision can be reliably detected based on whether or not at least one of rotational angular velocities $V\theta a$, $V\theta b$ is zero.

(7) The speed reduction members for producing resistances corresponding to moving speeds of the worms in the longitudinal directions are further provided.

According to such a construction, when the worms make translational movements in the rotation axis directions upon the contact or collision of the manipulator with an external object, energy dissipation action by the speed reduction members can also be utilized, wherefore the collision force can be more absorbed.

(8) A manipulator comprises a first link; a second link; first and second differential input shafts rotatably supported in the first link; a differential output shaft rotatably supported in the second link; a differential gear mechanism for rotating the differential output shaft about two axes orthogonal to each other in accordance with the sum or difference of rotating speeds of the first and second differential input shafts; a rotatable first worm elastically held at a specified position in such a manner as to be movable in a translation direction of a rotation axis; a first worm wheel fixed to the first differential input shaft and engaged with the first worm; a first driving source arranged in the first link for rotating the first worm; a rotatable second worm elastically held at a specified position in such a manner as to be movable in a translation direction of a rotation axis; a second worm wheel fixed to the second differential input shaft and engaged with the second worm; a second driving source arranged in the first link for rotating the second worm; a first shaft rotational angle sensor for detecting rotational angle information of the first differential input shaft; a second shaft rotational angle sensor for detecting rotational angle information of the second differential input shaft; a first driving rotational angle sensor for detecting rotational angle information of the first driving source; a second driving rotational angle sensor for detecting rotational angle information of the second driving source; and a controller for detecting the reception of an external force by the first or second link based on an output signal of the first or second shaft rotational angle sensor and an output signal of the first or second driving rotational angle sensor, wherein the first or second worm makes a translational movement in accordance with the external force received by the first or second link.

According to such a construction, the elastically supported worm makes a translational movement in the rotation axis direction thereof, thereby being able to quickly and elastically absorb and relieve a collision force if the manipulator comes into contact or collision with an external object such as a person or a structure. Further, the shaft rotational angle sensors and the driving rotational angle sensors provided to control the joint angle of the manipulator are used also as collision detecting sensors, and the collision is judged using the output values of these sensors. This obviates the need for a special sensor for detecting a collision, wherefore lower cost and lighter weight of the manipulator are realized and quick collision detection can be performed.

(9) The controller detects the reception of an external force by the first or second link based on whether or not at least one of a difference ($\theta a - \theta am$) between an actual rotational angle $\theta a$ of the first differential input shaft obtained from the output signal of the first shaft rotational angle sensor and a comparative rotational angle $\theta am$ of the first differential input shaft obtained from the output signal of the first driving rotational angle sensor and a difference ($\theta b - \theta bm$) between an actual rotational angle $\theta b$ of the second differential input shaft obtained from the output signal of the second shaft rotational angle sensor and a comparative rotational angle $\theta bm$ of the second differential input shaft obtained from the output signal of the second driving rotational angle sensor is zero.

According to such a construction, if the rotation of the differential input shafts is restricted by an external person or object when the manipulator comes into contact or collision with an external object during its operation, at least one of the rotational angles $\theta a$, $\theta b$ of the differential input shafts obtained from the shaft rotational angle sensors fixed to the differential input shafts is restricted to an angle at the time of the collision. At this time, the worm wheel fixed to the differential input shaft restricted to the angle at the time of the collision also has the rotation thereof restricted. Since the worm engaged with this worm wheel can slide along its rotation axis, it continues to rotate while making a translational movement. At this time, the driving source for driving the worm also continues to rotate. As a result, at least one of the driving rotational angles $\theta am$, $\theta bm$ has a value different from the corresponding rotational angle $\theta a$, $\theta b$ and at least one of the differences ($\theta a - \theta am$), ($\theta b - \theta bm$) has a value other than zero. Therefore, the collision can be detected.

As described above, according to this embodiment, response to a contact or collision with an external person or object is good and a collision force can be quickly absorbed and relieved. Further, since a special sensor for detecting a collision is not necessary, it is possible to provide a low-cost, light-weight and compact manipulator.

Industrial Applicability

A manipulator according to the present invention is useful as a joint of a low-cost, light-weight and compact manipulator which has good response to a collision, quickly and elastically absorbs and relieves a collision force and requires no special sensor for detecting a collision.

This application is based on Japanese Patent Application No. 2008-152592 filed on Jun. 11, 2008 in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A manipulator, comprising:
a first link;
a second link;
first and second differential input shafts rotatably supported on the first link;
a differential output shaft rotatably supported on the second link;
a differential gear mechanism for rotating the differential output shaft about two axes orthogonal to each other in accordance with a sum or difference of rotating speeds of the first and second differential input shafts;
a first transmitting portion for transmitting a driving force to the first differential input shaft;
a second transmitting portion for transmitting a driving force to the second differential input shaft;
a first shaft rotational angle sensor for detecting rotational angle information of the first differential input shaft;
a second shaft rotational angle sensor for detecting rotational angle information of the second differential input shaft; and
a controller for detecting a reception of an external force by the first or second link based on an output signal of the first or second shaft rotational angle sensor,
wherein each of the first and second transmitting portions includes a rotatable worm held in such a manner as to be movable in a translation direction of a rotation axis and a worm wheel engaged with the worm,
wherein the worm wheel of the first transmitting portion is fixed to the first differential input shaft and the worm wheel of the second transmitting portion is fixed to the second differential input shaft, and
wherein the first and second differential input shafts rotate in accordance with the external force received by the first or second link, thereby making the worm translationally move to absorb and relieve the external force, and a collision of the first link or the second link is detected by detecting a reception of the external force at the first or second link.

2. The manipulator of claim 1, further comprising an intermediate link for rotatably supporting the first and second differential input shafts and the differential output shaft, wherein:
the first and second differential input shafts are arranged on the same straight line, and
the differential gear mechanism includes a first input-side bevel gear fixed to the first differential input shaft and driven by the worm wheel of the first transmitting portion, a second input-side bevel gear fixed to the second differential input shaft and driven by the worm wheel of the second transmitting portion, and a driven-side bevel gear engaged with the first and second input-side bevel gears.

3. The manipulator of claim 1, further comprising:
a first driving source arranged in the first link for driving the worm of the first transmitting portion; and
a second driving source arranged in the first link for driving the worm of the second transmitting portion,
wherein the controller controls the driving of the first and second driving sources in accordance with output signals of the first and second shaft rotational angle sensors.

4. The manipulator of claim 1, wherein the controller detects the reception of an external force by the first or second link based on whether or not at least one of a rotational angular acceleration $A\theta a$ of the first differential input shaft obtained from the output signal of the first shaft rotational angle sensor and a rotational angular acceleration $A\theta b$ of the second differential input shaft obtained from the output signal of the second shaft rotational angle sensor is equal to or larger than a maximum rotational angular acceleration which can be generated in the first or second differential input shaft during a normal operation.

5. The manipulator of claim 1, wherein the controller detects the reception of an external force by the first or second link based on whether or not at least one of a rotational angular displacement $\Delta\theta a$ of the first differential input shaft obtained from the output signal of the first shaft rotational angle sensor and a rotational angular displacement $\Delta\theta b$ of the second differential input shaft obtained from the output signal of the second shaft rotational angle sensor is zero.

6. The manipulator of claim 1, wherein the controller detects the reception of an external force by the first or second link based on whether or not at least one of a rotational angular velocity $V\theta a$ of the first differential input shaft obtained from the output signal of the first shaft rotational angle sensor and a rotational angular velocity $V\theta b$ of the second differential input shaft obtained from the output signal of the second shaft rotational angle sensor is zero.

7. The manipulator of claim 1, further comprising speed reduction members for producing resistances corresponding to moving speeds of the worms in the longitudinal directions.

8. The manipulator of claim 1, wherein the manipulator is configured such that driving the first transmitting portion and the second transmitting portion in the same direction causes the second link to rotate in a pitch direction, and
wherein the manipulator is configured such that driving the first transmitting portion and the second transmitting portion in opposite directions causes the second link to rotate in a roll direction perpendicular to the pitch direction.

9. A method for detecting a collision of a manipulator which includes
first and second differential input shafts rotatably supported on a first link,
a differential output shaft rotatably supported on the second link,
first and second worms held in such a manner as to be movable in translation directions of rotation axis,
a first worm wheel engaged with the first worm and fixed to the first differential input shaft,
a second worm wheel engaged with the second worm and fixed to the second differential input shaft, and
a first shaft rotational angle sensor for detecting rotational angle information of the first differential input shaft; and a second shaft rotational angle sensor for detecting rotational angle information of the second differential input shaft,
wherein the first and second differential input shafts rotate in accordance with the external force received by the first or second link, thereby making the first or second worm translationally move to absorb and relieve the external force,
the method comprising:
detecting a collision of the first link or the second link, via one of said shaft rotational angle sensors, by detecting a reception of an external force by the first or second line based on an output signal of the first or second shaft rotational angle sensor.

10. The method of claim 9,
providing and operating the manipulator,
wherein the manipulator is configured such that driving the first transmitting portion and the second transmitting portion in the same direction causes the second link to rotate in a pitch direction, and
wherein the manipulator is configured such that driving the first transmitting portion and the second transmitting portion in opposite directions causes the second link to rotate in a roll direction perpendicular to the pitch direction.

11. A method for controlling a manipulator comprising
first and second differential input shafts rotatably supported on a first link; a differential output shaft rotatably supported on a second link,
first and second worms held in such a manner as to be movable in translation directions of rotation axes,
a first worm wheel engaged with the first worm and fixed to the first differential input shaft,
a second worm wheel engaged with the second worm and fixed to the second differential input shaft,
a first driving source provided in the first link for rotating the first worm; a second driving source provided in the first link for rotating the second worm,
a first shaft rotational angle sensor for detecting rotational angle information of the first differential input shaft, and
a second shaft rotational angle sensor for detecting rotational angle information of the second differential input shaft,
wherein the first and second differential input shafts rotate in accordance with the external force received by the first or second link, thereby making the first or second worm translationally move to absorb and relieve the external force;
the method comprising:
detecting a collision of the first link or the second link, via one of said shaft rotational angle sensors, by detecting a reception of an external force by the first or second line based on an output signal of the first or second shaft rotational angle sensor.

12. The method of claim 11, further comprising:

providing and operating the manipulator, wherein the manipulator is configured such that driving the first transmitting portion and the second transmitting portion in the same direction causes the second link to rotate in a pitch direction, and wherein the manipulator is configured such that driving the first transmitting portion and the second transmitting portion in opposite directions causes the second link to rotate in a roll direction perpendicular to the pitch direction.

* * * * *